United States Patent Office 3,547,611
Patented Dec. 15, 1970

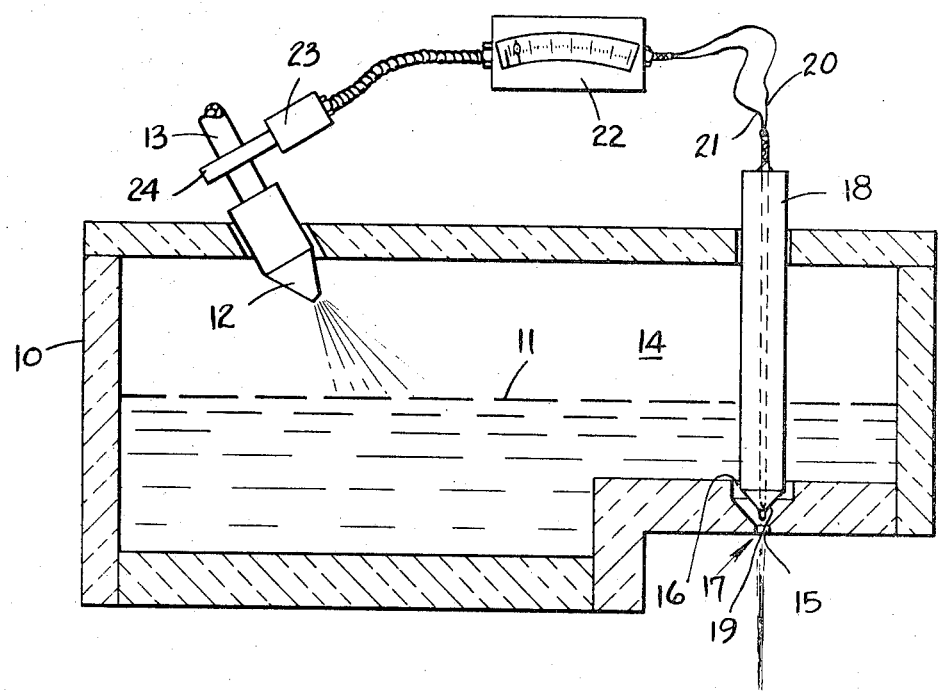

3,547,611
CONTROL SYSTEM FOR GLASS MELTING FURNACES
Byron Edwin Williams, Richmond, Ind., assignor to Johns-Manville Corporation, New York, N.Y., a corporation of New York
Filed Mar. 28, 1968, Ser. No. 716,926
Int. Cl. C03b 5/24
U.S. Cl. 65—129                       8 Claims

ABSTRACT OF THE DISCLOSURE

Apparatus and method for controlling the rate of flow of molten glass from the discharge orifice of a glass melting furnace by regulating the viscosity of the glass melt through furnace heat input adjustments in response and relative to temperature measurements of the glass melt in the area within the glass melt discharge outlet of the furnace, at a location substantially concentric therewith.

BACKGROUND OF THE INVENTION

This invention relates to glass melting furnaces, and in particular glass melting furnaces for use in the manufacture of glass fibers, especially rotary centrifugal fiberizing processes such as illustrated in U.S. Pat. No. 3,265,477 or No. 2,949,632. In typical glass manufacturing operations of a continuous procedure, rather than simply batch production, the precise control of the furnace discharge of molten glass and in turn feed to a subsequent forming operation, which in turn also inherently entails and dictates the glass melt rate of the furnace and the rate and uniformity of following forming operations, is highly significant in achieving optimum product characteristics and production, as is evidenced by the prior art, e.g. U.S. Pat. No. 2,929,675. Development of means for effectively controlling the furnace discharge rate to rather exacting conditions have not been forthcoming, particularly of such precision as to meet the highly critical requirements of rotary fiberization of glass for a maximum operating effectiveness and product quality.

This invention is primarily concerned with an improvement in the control of the rate of flow of molten glass from the melting furnace to the fiberizing means or other glass forming operations.

SUMMARY OF THE INVENTION

This invention comprises governing the glass melting furnace operation conditions and specifically adjusting the degree of heat input of the burner or other heat source, and in turn the general melt temperatures and glass melt viscosity which determines the melt discharge flow rate through the outlet orifice, in response to temperature conditions of the glass melt within the critical area of the furnace discharge outlet orifice.

It is the primary objective and advantage of this invention to provide means of achieving effective and precise control and uniformity of the glass melt discharge from a glass furnace and feed to subsequent glass forming operations.

BRIEF DESCRIPTION OF THE DRAWING

This invention will be more fully understood and further objects and advantages thereof will become apparent when reference is made to the following detailed description of a preferred embodiment of the invention and the accompanying drawing in which:

FIG. 1 is a pictorial view of a glass furnace partly in half-section, illustrating a preferred and typical embodiment of the temperature sensing means and the essential location thereof for the precise controlling of the furnace operation.

DETAILED DESCRIPTION OF THE PREFERRED EMBODIMENT

Variations in glass discharge or feed from the melting furnace through an outlet orifice of fixed dimensions are primarily due to changes in or non-uniformity of the viscosity of the glass melt within the furnace, a condition which can be regulated or modulated to maintain a substantially constant viscosity by adjusting the heat input. The basis of this invention comprises precisely controlling the discharge rate or feed of glass from the melting furnace through an outlet orifice by adjusting the furnace operation or heat input in response and relation to the temperature of the molten glass within the area of the outlet orifice itself and means therefor including a temperature measuring thermocouple essentially positioned substantially concentric within the outlet orifice of the furnace discharge and operatively connected with and actuating a conventional control means for adjusting the heat source and its intensity or input to in turn regulate the viscosity of the glass melt within the furnace and in particular in the area adjacent to the outlet orifice.

Referring to the drawing there is shown a preferred arrangement and means, with part in section, including a conventional tank type furnace and conventional control apparatus, illustrating the essential location of the area of determining the temperature to govern the furnace operation or heat input of the burner or other heat source, and means for measuring the temperature at the critical and sensitive location. The glass melting furnace comprises a furnace tank 10 of suitable refractory material and containing the supply of molten glass 11. The heat source for the furnace consists of one or more gas fired burners 12 supplied with fuel and air through conduit 13, or alternatively other conventional heat sources such as an oil fired or electrical heater. The tank 10 is preferably constructed with a forehearth section 14 having located in the bottom thereof an outlet orifice 15 for the discharge of the molten glass from the furnace and feed to a subsequent forming operation such as a fiberizing process. The outlet orifice 15 is preferably constructed with an enlarged entrance 16 adjacent the furnace interior and a constricted exit 17 adjacent the furnace exterior, thus being generally funnel shaped, and provided with a cooperating plunger member 18 which can be vertically moved and positioned to close off the outlet 15 or to open the outlet orifice and access of the molten glass thereto to any set degree, and as such functioning as a reciprocating valve.

Positioned on the tip of the plunger 18 and carried thereby is a thermocouple 19 with the lead wires 20 and 21 extending back through the length of the plunger to the exterior of the furnace tank and from there operatively connected with a control device 22 which may comprise a conventional control mechanism such as an electrical relay, and which in turn, in response to the temperature measurements of the thermocouple, activates and operates mechanism 23 such as a reversible motor to adjust the heat input by further opening or closing valve 24 in the fuel and air supply conduit 13, or appropriately increase or decrease other sources of heat energy. Other means or constructions than the plunger can, of course, be utilized to carry the thermocouple, it being primarily essential that the thermocouple or temperature measuring means which activates and dictates regulation of the furnace operation be located substantially concentric within the sensitive and critical area of the outlet orifice, that is positioned generally in line with the longitudinal axis of the orifice through the furnace structure. Moreover, the mechanism or system for receiving and translating the temperature measurements from the thermocouple or temperature measuring means, and in response thereto transmitting and carrying out the operation of adjusting the heat input, may constitute any suitable conventional system or devices therefor such as are amply disclosed and described in the prior art.

In actual operation, controlling the heat input of the glass melting furnace through the adjustment of the burner in response to the temperature measured within the outlet orifice of the melting furnace and in turn modulation of the viscosity of the glass melt and thereby maintaining it substantially constant, effected a reduction in temperature variations of the glass melt within the furnace from a prior condition of about ±20° F. or greater over periods as brief as an hour, to a temperature variation of ±3° F. or less, even with a rather crude control system. The placing of the temperature measuring thermocouple in other locations submerged within the molten glass including in areas around the outlet orifice was found not to enable effective and uniform control of the molten glass discharge through the outlet orifice. Apparently, the overall mass of molten glass within the furnace was not effectively maintained at uniform temperature and in turn viscosity conditions whereby the molten glass would channel in alternate and erratic paths within the mass of molten glass and particularly along the bottom of the furnace thereby alternately avoiding or bypassing temperature sensing means positioned in other locations within the melt including areas around the outlet orifice. Regardless of the presumed or actual cause of the inoperativeness or inaccuracy of prior means, the variations in discharge or feed of molten glass from the furnace are effectively and precisely controlled by the means of this invention and as a result of the constant uniformity of feed of the molten glass maximum operating rates are attained with production at the highest feasible level together with improved product characteristics of optimum uniformity.

It is to be understood that the foregoing details are given for the purpose of illustration and not restriction and that variations within the spirit of the invention are to be included within the scope of the appended claims.

What I claim is:

1. Method of controlling and maintaining substantially constant the rate of flow of molten glass from an outlet orifice of a glass melting furnace having a heat source, comprising measuring the temperature of the glass melt within the outlet orifice of the furnace at a location substantially concentric therewith and in response and relation to the measured temperature of the glass within the outlet orifice of the furnace, adjusting the heat input of the heat source and thereby regulating the viscosity of the molten glass within the glass melting furnace and in turn controlling the rate of flow of the molten glass through the outlet orifice.

2. In a glass melting furnace comprising an outlet orifice for discharging molten glass from the furnace, means for heating the furnace to melt the glass forming constituents and obtain the designed glass melt viscosity, and control means for adjusting the heat input of the heating means; the improvement comprising means for sensing and measuring the temperature of the glass melt positioned within and substantially concentric with the outlet orifice of the furnace to actuate the control means to adjust the heat input of the heating means in response to changes in the temperature of the glass melt within the outlet orifice and thereby control the viscosity of the molten glass and its rate of flow through the outlet orifice.

3. The glass melting furnace of claim 2, in which said temperature sensing and measuring means comprising a temperature sensing thermocouple located substantially concentrically within the outlet orifice and connected operatively to the control means.

4. The glass melting furnace of claim 3 wherein the temperature sensing thermocouple is positioned on the tip of and carried by a plunger which cooperates with the outlet orifice to provide an adjustable valve therefor.

5. The glass melting furnace of claim 4 wherein the outlet orifice for the discharge of molten glass from the furnace is located in the floor of the furnace structure.

6. The glass melting furnace of claim 5 wherein the plunger carrying the temperature sensing thermocouple positioned on its tip is vertically mounted substantially concentric in relation to the outlet orifice in the floor of the furnace structure.

7. The glass melting furnace of claim 6 wherein the furnace is provided with a forehearth section and the outlet orifice is located in the floor of the forehearth sections of the furnace structure.

8. The glass melting furnace of claim 7 wherein the outlet orifice for the discharge of the molten glass from the furnace is generally funnel shaped with an enlarged entrance adjacent to the furnace interior and a restricted exit adjacent to the furnace exterior.

References Cited
UNITED STATES PATENTS

| | | | |
|---|---|---|---|
| 2,929,675 | 3/1960 | Von Wranau et al. | 65—2 |
| 3,244,495 | 4/1966 | Apple et al. | 65—161 |

S. LEON BASHORE, Primary Examiner

S. R. FRIEDMAN, Assistant Examiner

U.S. Cl. X.R.

65—158, 162, 330